United States Patent [19]
McWilliams

[11] 3,788,444
[45] Jan. 29, 1974

[54] STEERING CONTROL FOR POWER DRIVEN MOBILE CONVEYORS

[76] Inventor: Joseph E. McWilliams, 1345 Canterbury Ln., Glenview, Ill. 60025

[22] Filed: Oct. 24, 1972

[21] Appl. No.: 299,680

[52] U.S. Cl.................... 198/2, 180/6.48, 180/44 F
[51] Int. Cl... B60k 17/30, B60k 17/34, B65g 67/04
[58] Field of Search........................... 198/2–3, 233; 180/44 R, 44 F, 79.2 C, 6.48; 280/91

[56] References Cited
UNITED STATES PATENTS
2,358,236   9/1944   Lee .......................... 180/79.2 C X Primary Examiner—Edward A. Sroka
Attorney, Agent, or Firm—Robert C. Brown, Jr. et al.

[57] ABSTRACT

A steering control arrangement for power driven mobile conveyors in which the conveyor frame is provided with a pair of wheels at each end of same, which one wheel of each pair is power driven to move the conveyor frame, and is selectively power steerable about a vertical axis through a range of 180° or more relative to the transverse dimension of the frame, and the other wheel of each pair is of the idler caster type. The power steerable wheels may be positioned transversely, longitudinally, or diagonally of the conveyor frame to move the conveyor laterally or longitudinally of same, or turn the conveyor in either direction or end for end.

7 Claims, 10 Drawing Figures

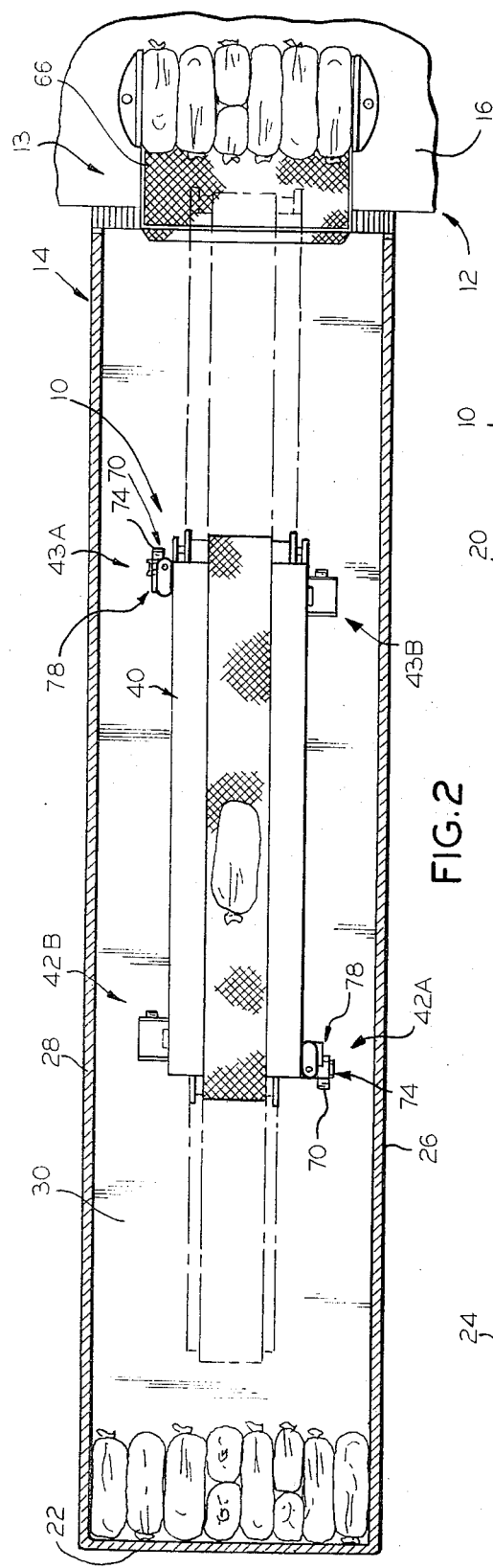
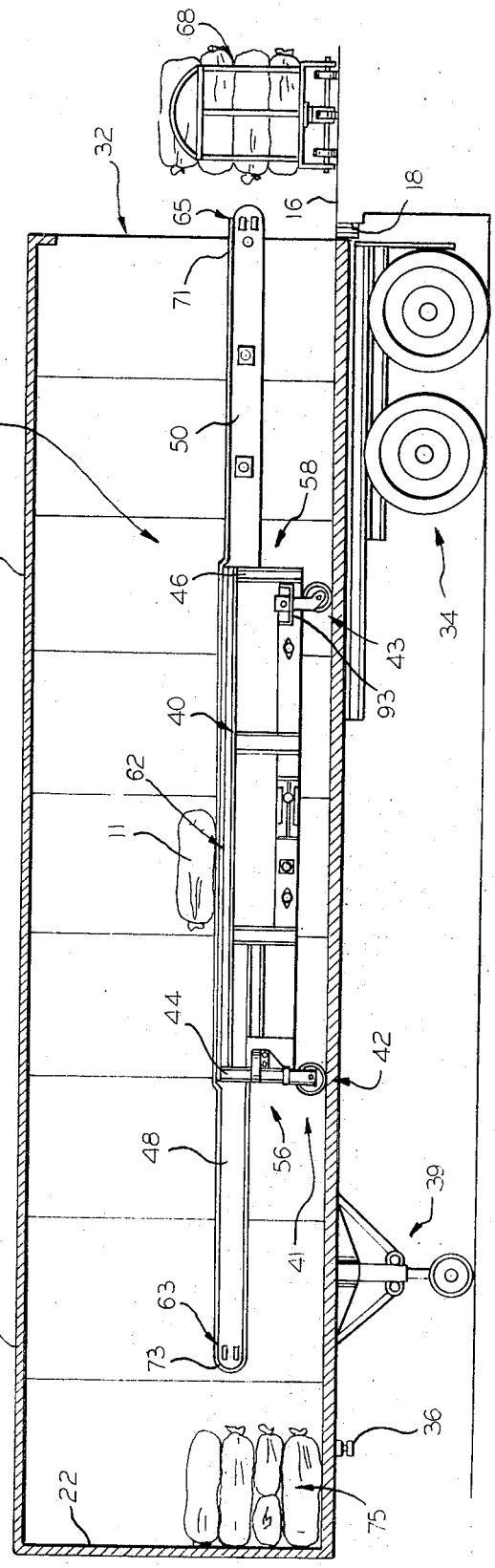

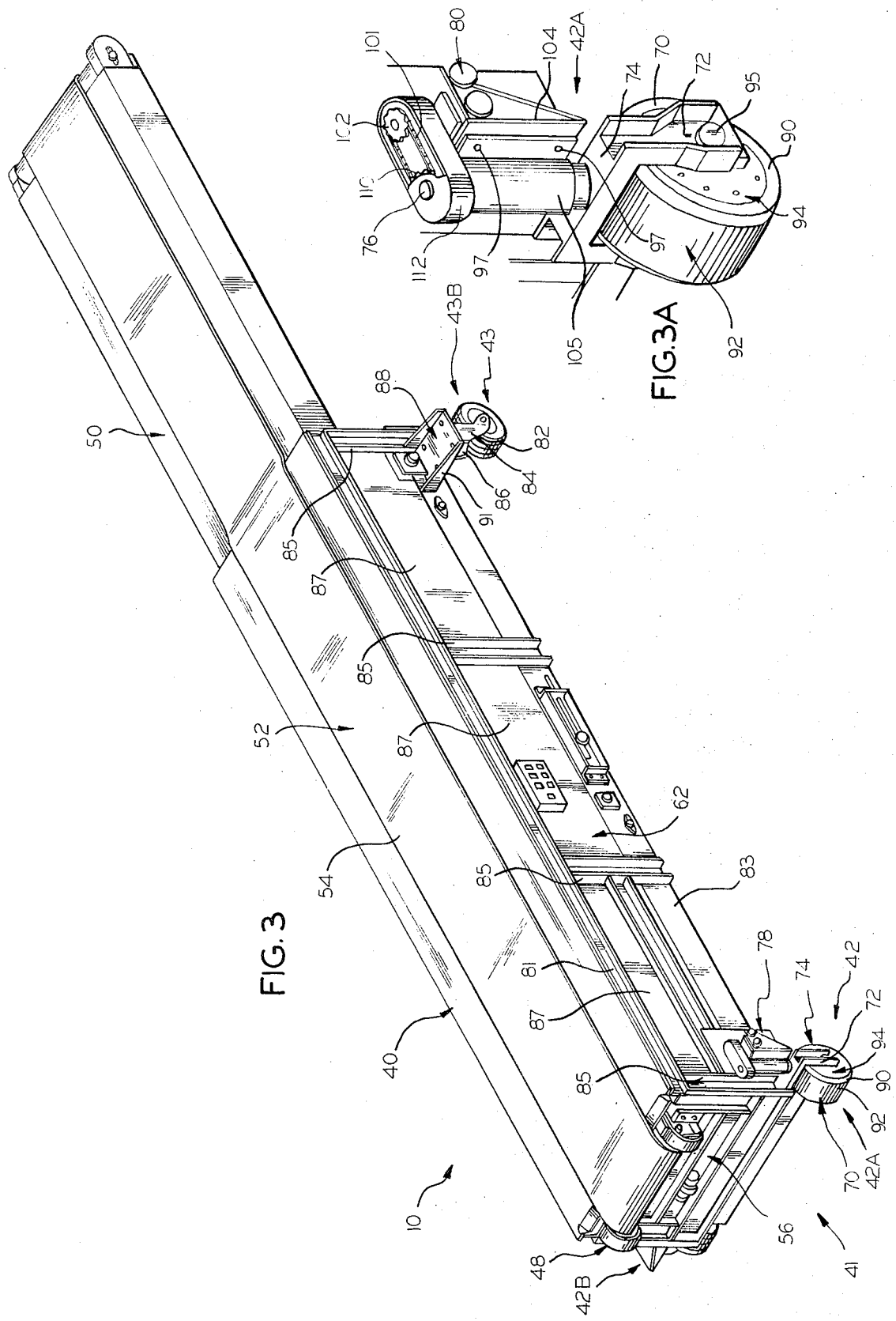

3,788,444
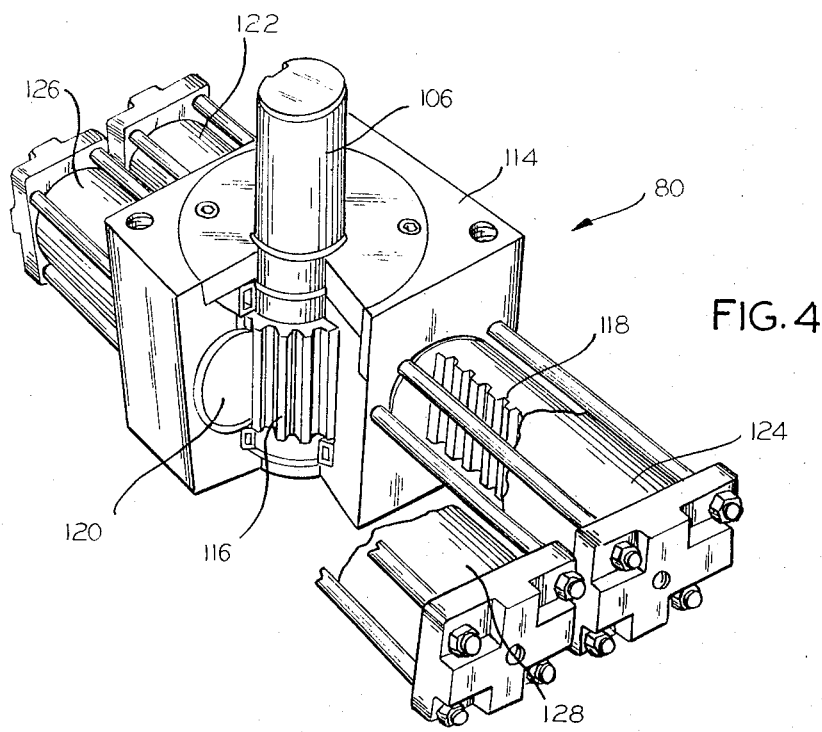
FIG.4
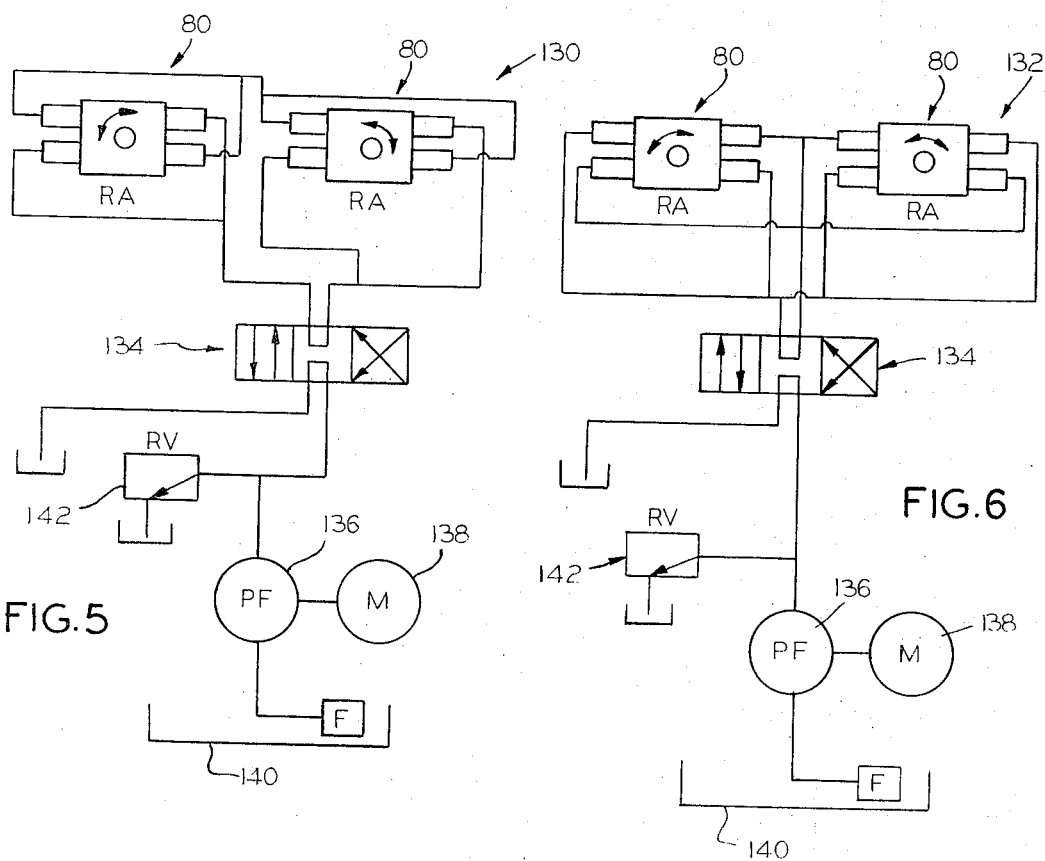
FIG.5
FIG.6

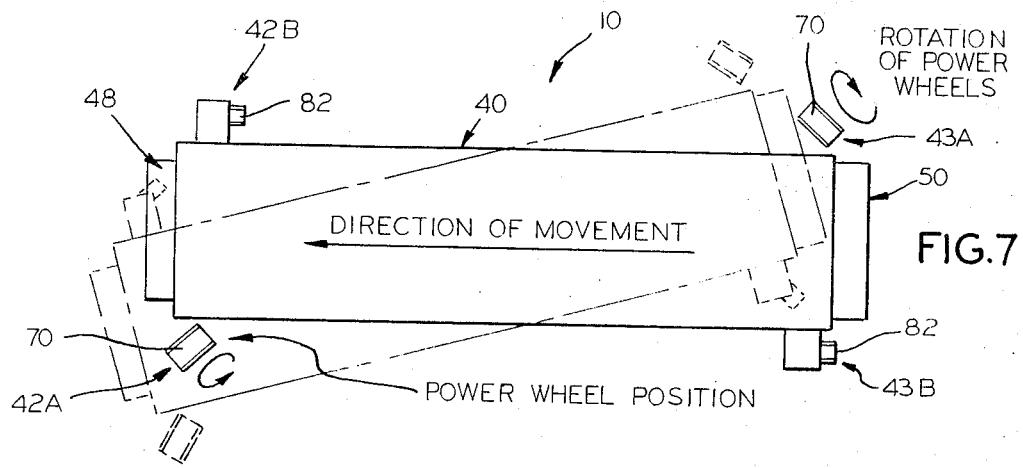
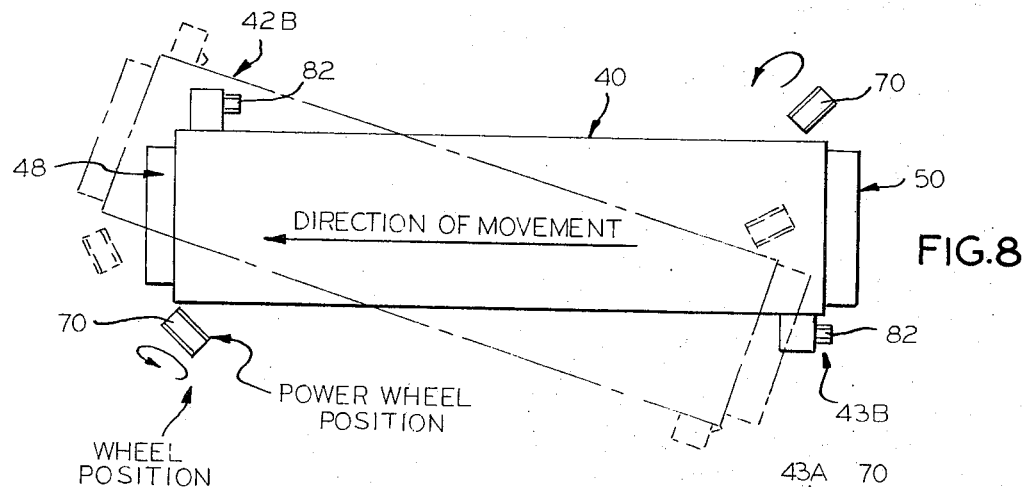
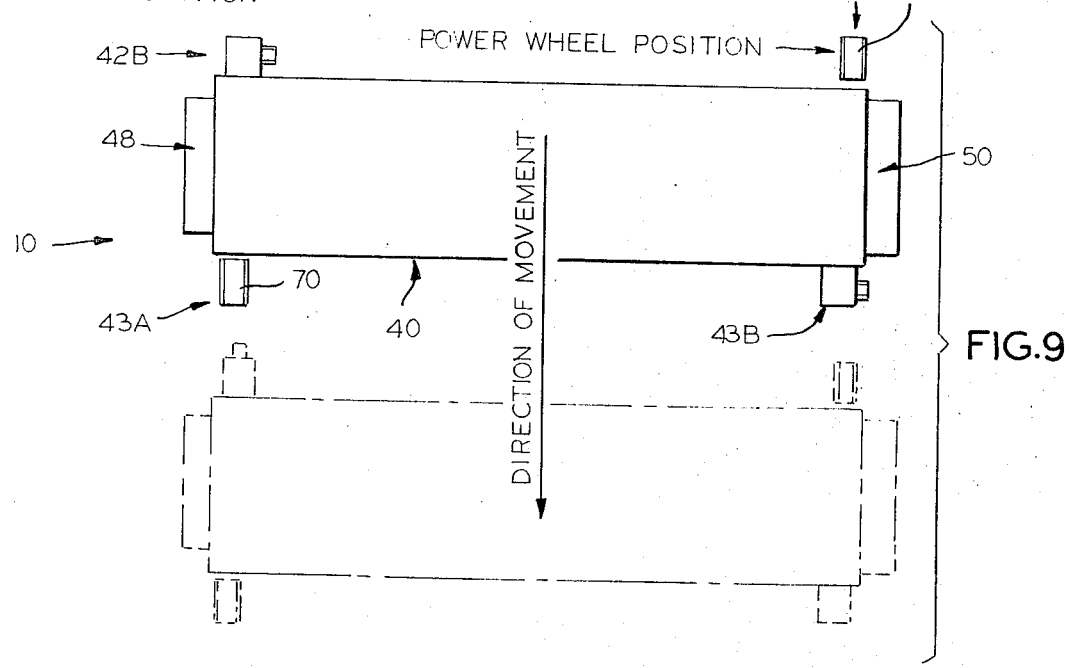

STEERING CONTROL FOR POWER DRIVEN MOBILE CONVEYORS

This invention relates to a steering control arrangement for mobile conveyors, and more particularly, to a steering control arrangement that permits the conveyor to readily shift the conveyor laterally thereof or be rotated within its length to reverse its position, in addition to providing directional steering control for forward or rearward movement.

My application Ser. No. 275,791, filed July 27, 1972 (the disclosure of which is hereby incorporated herein by this reference) discloses a balanced extendible mobile conveyor arrangement that is especially suited for the practice of the present invention in the loading and unloading of mail bags to and from vehicles suitable for transporting same. The said balanced extendible conveyor comprises an elongate wheeled main frame having a pair of oppositely directed retractable frames at opposite ends thereof that are in substantially parallel coplanar relation and that are movable in a balanced synchronized manner inwardly and outwardly of the respective frame ends, with a single belt conveyor trained over the top of the wheeled frame and the ends of the retractable frames that is arranged for automatic slack let out and take up as the retractable frames are extended and retracted to extend and retract the conveyor. The retractable frames are arranged so that they telescope one within the other and both within the main frame as they move toward their retracted positions. The main frame includes a reversable drive for the belt and driving wheels for the main frame for driving and steering purposes.

While conveyors of this type are quite useful, it is important, in order to be able to take full advantage of their utility, to be able to move or shift them with facility between working positions in the areas in which they are to be used. For instance, in the loading and unloading of bagged mail to and from highway and railway transport vehicles, operating space within the vehicle and adjacent same is ordinarily restricted, making it difficult to maneuver a portable conveyor of any size. Yet portable conveyors are desirable for purposes of this type as they can be stored in an out of the way place when not used, and yet be brought into working position when needed.

A principal object of this invention is to provide a steering control system for power propelled conveyors of the type disclosed in my said application, which makes the conveyor assembly completely maneuverable in any direction while requiring positioning of only one steering wheel at either end of the conveyor.

Another principal object of the invention is to provide a steering control system for portable power propelled conveyors that makes either one or both ends of the conveyor steerable at the option of the operator in a manner that permits selectability of any direction of movement desired.

Other objects of the invention are to provide a power propelling arrangement for portable conveyors with steering control therefor that is readily applicable to both new and existing equipment, that requires no special skill to operate, and that is inexpensive of manufacture, efficient and versatile in operation, and long lived in use.

In accordance with this invention, the conveyor frame is equipped with a pair of supporting wheels at each of its ends, with one wheel of each pair being power operated for propelling the conveyor frame, and the power operated wheels being at diagonally opposite corners of the conveyor frame. The power operated wheels are each mounted on a vertical spindle with each such spindle being operably coupled with a powered actuator to turn the spindle to selectively position the respective wheels in accordance with the type of movement of the frame that is desired. The other wheel of each pair is of the familiar idler caster type. The steerable power wheels may be positioned transversely of the frame for lateral movement of the frame, and longitudinally thereof for forward and reverse movement of the frame. Diagonal positioning of the power wheels relative to the frame permits turning of the frame in either direction or rotation of the frame end to end if desired.

Other objects, uses, and advantages will be obvious or become apparent from a consideration of the following detailed description and the application drawings.

In the drawings:

FIG. 1 is a diagrammatic side elevational view of a semi-trailer in the process of being loaded with mail bags by employing the apparatus of my said application, with the body of the semi-trailer being shown in vertical section, and the apparatus equipped with the steering control arrangement of this invention;

FIG. 2 is a plan view of the apparatus shown in FIG. 1, with the semi-trailer body shown in horizontal section, and the conveyor apparatus shown in its contracted relation in the full line showing, and in its extended relation in the broken line showing;

FIG. 3 is a diagrammatic perspective view of the apparatus, showing the wheels positioned for propelling the conveyor apparatus longitudinally thereof, and showing one end of the conveyor extended;

FIG. 3A is a fragmental perspective view illustrating one of the power drive wheel assemblies of this invention on an enlarged scale;

FIG. 4 is a diagrammatic perspective view of a suitable rotary actuator device for positioning the steerable power wheels of the apparatus of FIGS. 1 – 3 for steering purposes;

FIGS. 5 and 6 are diagrams illustrating alternate hydraulic control arrangements for operating the rotary actuators of the apparatus of FIGS. 1 – 3;

FIGS. 7 and 8 are diagrams illustrating the manner of positioning the driving wheels of the apparatus of FIGS. 1 – 3 for turning the conveyor in either direction; and FIG. 9 is a view similar to those of FIGS. 7 and 8 illustrating the manner of positioning the power drive wheels for moving the conveyor bodily laterally thereof.

However, it is to be distinctly understood that the specific drawing illustrations provided are supplied primarily to comply with the requirements of the Patent Code, and that the invention is susceptible of other embodiments that will be obvious to those skilled in the art and which are intended to be covered by the appended claims.

GENERAL DESCRIPTION

Reference numeral 10 of FIGS. 1 – 4 generally indicates one embodiment of the present invention in the form of the balanced extendible conveyor of my said application having applied thereto the steering control arrangement of this invention, which apparatus 10 is shown being employed for loading mail bags 11 from a loading dock 12 into an end loading highway vehicle 14, which has been illustrated as being in the form of the familiar semitrailer, although the invention is readily applicable to the loading of a wide variety of vehicles including railroad cars.

While the invention is disclosed in connection with the handling of mail bags, as this is one of the areas of that application in which the invention is of special significance, it is to be understood that the apparatus 10 is readily adapted for handling packaged goods in general, including goods that are either bagged or boxed, and the like.

It is assumed that the mail bag handling installation involved in connection with which the apparatus 10 is being used includes the loading dock 12 (of a post office or the like) that is conventionally provided with a level load support surface 16 and the usual shoulder or end 18 against which the vehicle 14 is backed for purposes of being loaded at the loading bay 13.

It is also assumed that the vehicle 14 may be in the form of the usual body 20 defined by forward end wall 22, top wall 24, side walls 26 and 28, floor 30, and end opening 32 that is customarily closed by suitable doors or the like (not shown). When disconnected from the truck tractor, vehicle 14 rests on suitable retractable props 39 adjacent its forward end.

The specifics of the basic conveyor arrangment of my said application are described in detail in my said application, to which reference may be had for all details. However, for purposes of this invention, it is pointed out that the apparatus 10 generally comprises a main or wheeled frame 40 that rides on front wheels generally indicated by reference numeral 42 and rear wheels generally indicated by reference numeral 43, and is elongate in configuration defining opposite ends 44 and 46. The main frame 40 includes a pair of retractable end frames or booms 48 and 50 which are mounted in substantially parallel coplanar relation, and are mounted for movement between the contracted positions indicated in FIG. 2 to the extended positions indicated in FIG. 1 to extend the conveyor from its contracted relation shown in the full line showing of FIG. 2 to the extended relation shown in the full line showing of FIG. 1.

Trained over the main frame 40 and retractable frames 48 and 50 is conveyor belt 52, the upper run 54 of which defines the load supporting surface of the conveyor, and is what is extended by the extension of the frames 48 and 50 from their retracted positions. Conveyor belt 52 is trained over bend pulleys, drive pulleys and the like in th manner described in said application to accommodate the extension and retraction of the frames 48 and 50 that is contemplated for the apparatus of said application.

Frames 48 and 50 are moved between their retracted and extended positions by drive mechanisms indicated at 56 and 58, respectively, which are arranged to selectively operate independently of each other, or operate in synchronized but reversed speeds so that the frames 48 and 50 move outwardly and inwardly of the wheeled frame 40 in a balanced and synchronized manner. Conveyor belt 52 is driven by a drive mechanism (not shown) which is operable to drive the belt in either direction at the selection of the operator, and at a speed in the range of from about 40 to about 100 feet per minute.

In accordance with the present invention, a steering control arrangement 41 is provided in which the forward wheels 42 comprise a powered drive wheel assembly 42A and an idler caster type wheel assembly 42B, while the rear wheels 43A comprise a powered drive wheel assembly 43A and an idler caster type wheel assembly 43B. The powered drive wheel assemblies 42A and 43A are at opposite ends of the apparatus 10, and are operably associated with diagonally opposite corners of the main frame 40 for steering control purposes. The assemblies 42A and 43A are identical, and comprise (see FIGS. 3 and 3A) power wheel 70 mounted within the arms 72 of a clevis structure 74 which includes a vertically disposed spindle 76 suitably journaled in a bracket structure 78 affixed to the corner of the main frame 40 and coupled with a rotary actuator device of the general type indicated at 80 in FIG. 4 for rotating or pivoting spindle 76 about its axis to shift the respective wheels 42A and 43A to and between the positions indicated in FIGS. 7 – 9.

The idler wheel assemblies 43B comprise suitable idler wheel 82 appropriately journaled between the arms 84 of suitable clevis structure 86 that is suitably rotatably affixed to bracket structure 88 in the usual caster type relation. Bracket structure 88 is in turn suitably fixed to main frame 40.

The powered wheels 70 each have their own built in hydraulic motor so that by driving the wheels 42A and 43A the apparatus 10 may be propelled or moved as desired, which movement is controlled by appropriate positioning of the wheels 42A and 43A in the manner indicated in FIGS. 7 – 9. Wheels 82 caster to follow the turning movement of the apparatus 10 in the usual caster manner, and actuators 80 are operative to turn wheels 42A and 43A at least 90 degrees in either direction from alignment with main frame 40, and optionally up to 360° relative to that position.

The apparatus 10 is provided with a suitable control panel arrangement where indicated at 62 at which the controls for the drive mechanisms 56 and 58, the drive for conveyor belt 54, and the wheels 42A and 43A (both steering and drive control) are located for convenience of operation by the operator. The retractable frames 48 and 50 each have their own control panel 63 and 65 respectively, for operating same from a position adjacent either end of the apparatus and these control panels include alternate controls for belt 54 and forward and reverse movement of wheels 70.

The apparatus 10 when not in use may be in the contracted relation shown in full lines in FIG. 2, and suitably stored on the loading platform 12. When the vehicle 14 is to be loaded, the apparatus 10 is moved into place by operating drive wheels 70 and actuators 80 to propel the apparatus and steer same into operating position.

In this connection, when wheels 42A and 43A are aligned longitudinally of the apparatus 10, the apparatus 10, when wheels 70 are driven in the same direction, will move forwardly, or rearwardly, depending on the specific direction of rotation of the wheels 70. Caster assemblies 42B and 43B automatically align themselves with the direction of movement in the usual manner of function of caster wheels. Where a turn to the left is desired, rotary actuators 80 are operated to position the assemblies 42A and 43A in the manner indicated in FIG. 7, while turning movement in the other direction is achieved by positioning the assemblies 42A and 43A in the manner indicated in FIG. 8 (both assuming wheels 70 are driven in the direction indicated by the arrows).

In any event, when the apparatus 10 has been moved into the vehicle 14 (assuming the vehicle 14 is empty), driving action of the wheel assemblies 42A and 43A is stopped when the vehicle is approximately in the position of FIGS. 1 and 2 with respect to the vehicle, and the drive mechanisms 56 and 58 operated to extend the conveyor as need be between the loading dock 12 and the location within the vehicle loading area at which the mail bags are to be loaded. Where the vehicle is to be fully loaded from the dock, the apparatus will initially be substantially fully extended to mechanically convey the bags 11 to adjacent the vehicle end wall 22 for stacking purposes at that location. Suitable conventional bridge plate 66 (shown only in FIG. 2) may be employed to bridge the gap between the vehicle 14 and the loading dock 12.

A conventional hand truck 68 (known in the art as a nutting truck) loaded with mail bags 11 may then be disposed adjacent the extended end 71 of the frame 50 for convenient manual positioning of the mail bags 11 on the conveyor belt 52. When the belt drive mechanism is actuated to move the belt upper run 54 to the left of FIGS. 1 and 2, the bags will be manually applied to and be moved single file fashion, on belt run 54, across the apparatus 10 to the projecting end 73 of retractable frame 48, where a worker standing adjacent the end 73 can grasp the bags as they near the ends 73 and manually stack them to form a stack 75 of mail bags 11 against the front wall 22 of the vehicle 14. As soon as one hand truck 68 is emptied it is replaced by another loaded hand truck for emptying in the same manner.

When the initial stack 75 is completed up to ceiling height, the extension of the frame 48 is adjusted relative to the vehicle body 20 so that the next adjacent stack (not shown) may be formed, and loading proceeds to complete that stack. This is done by the worker who is at the end 73 of the frame 48 pushing control buttons on the control panel 63 that will effect retraction of frame 48 relative to frame 40 and independent of frame 50 (the latter remaining stationary). Further stacks are formed in like manner, with the frame 48 being retracted as necessary to permit the formation of new mail bag stacks up to the ceiling of the vehicle. When the vehicle has been loaded to the point where the frame 48 is fully retracted, the operator operates drive wheels 70 to move the apparatus 10 rearwardly of the vehicle, and effects retraction of frame 50 as required to keep its end 71 approximately where indicated in FIGS. 1 and 2 relative to the hand trucks 68 being unloaded. Loading of the vehicle 14 continues and the conveyor apparatus 10 is moved, and its end frame 50 retracted, in a similar manner as new stacks 75 are formed, until the end frame 50 is fully retracted (in which condition for the illustrated embodiment, the vehicle 14 will be approximately two-thirds loaded). At this point only for the length of the main frame 40 will it be necessary to convey the bags 11 from their position of unloading from the hand truck 68 to their position of loading within the vehicle 14, the apparatus 10 being moved rearwardly of the vehicle and outwardly on the dock as stacks 75 are completed to complete the vehicle loading operation.

When loading of the vehicle is completed, the end opening of the vehicle is closed in the usual manner and the vehicle 14 driven off.

By positioning the power wheel assemblis 42A and 43A in the position shown in FIG. 9, the apparatus 10 may then be moved laterally thereof, by driving wheels 70 in the appropriate direction, to an adjacent loading bay for loading another vehicle 14. Alternately, the apparatus 10 may be stored or left standing to await arrival of another vehicle 14 at the bay 13.

SPECIFIC DESCRIPTION

The loading dock 12 that is illustrated is intended to be representative of conventional loading docks now commonly associated with post office installations and the like. The vehicle 14 may be of any standard type, that illustrated intended to represent a typical highway vehicle now in use for handling bagged mail, although it is to be understood that the invention is equally applicable to other vehicles that are not of the semi-trailer type. For instance, the apparatus 10 can also be used for loading and unloading railroad boxcars, with the apparatus being driven into the door opening at an angle with respect to the longitudinal axis of the car, as may be necessary to position it within the car, after which the wheel assemblies 42A and 43B are operated as necessary to align the apparatus 10 within the vehicle. The frames 48 and 50 are extended as necessary and conveyor belt 52 supplied with mail bags or the like either manually or by a feed conveyor projecting into the car and over the belt 52 for discharge of mail bags thereon. Belt 52 is driven in the direction of desired discharge of the bags. After one end of the car is loaded, the other end is loaded in a similar manner, with the extendible frame or boom at that end of the apparatus being extended and retracted as necessary and the belt 52 being driven in reverse direction. The apparatus 10 is then driven out of the railroad car, and the space in alignment with the car doors filled by extending one of the frames 48 or 50 into such space for transport of mail bags into same for manual removal and placement into the car.

The main or wheeled frame 40 of the apparatus 10 comprises upper and lower frame members 81 and 83 on either side thereof which are suitably joined together by vertical frame members 85 and suitable internal framing members (not shown). Closure plates 87 fixed to the frame members of frame 40 and closing off the openings defined by the horizontal and vertical frame members of same may be employed.

The bracket structures 88 that mount the caster wheel assemblies 42B and 43B may be of any suitable type, those being illustrated comprising channel member 91 suitably fixed to the frame 40 outrigger style and mounting suitable bearing assembly 93 (see FIG. 1) to which clevis structure 86 is operably coupled for rotatable movement about a vertical axis in the usual and customary caster manner.

The drive wheels 70 may be arranged in a manner similar to that described in U.S. Pat. No. 3,008,424 (an example of which is the unit made and sold under the trademark HYDRO-WHEEL by Flo-Tork, Inc.), and for purposes of illustration each is shown as comprising a rim 90 mounting the usual tire 92 or the like, which rim is suitably driven by a hydraulic power device 94 mounted within the rim 90 in a manner comparable or equivalent to conventional hydraulic driven conveyor rollers. The hydraulic drive mechanism 94 is mounted within the arms 72 of the clevis structure 74, as already indicated, with wheel 90 being journaled on stationary shaft 95 that is mounted in the arms 72. The bracket structures 78 each comprise mounting plates 100, 102 and 104 suitably fixed together and to main frame 40 and appropriately mounting the rotary actuator 80 so that the spindle 76 may be coupled to the actuator spindle 106 by suitable chain 108 trained over sprockets 110 and 112, respectively keyed to the spindles 76 and 106. A suitable guard shield 112 is applied over the drive chain and its sprockets of the respective assemblies 42A and 43A. Spindle 76 is journaled in operating position for 360 degrees turning movement, in the form shown, by mounting plate 105 shiftably removably fixed to the plates 104, as by employing bolts 97. Wheels 70 are supplied from a suitable pressure liquid source carried by frame 40.

The general nature of a suitable form of rotary actuator 80 is shown in FIG. 4 wherein it will be seen that spindle 106 is suitably journaled in housing 114 and has keyed thereto gear 116 that meshes with racks 118 and 120 operating in the respective hydraulic cylinders 122 and 124 and 126 and 128, for the respective racks 118 and 120.

Actuator 80 may be arranged substantially in accordance with U. S. Pat. Nos. 2,844,127, 2,844,128, and 3,246,581 (that illustrated being the unit made and sold by Flo-Tork, Inc. under the trademark FLO-TORK), but, of course, other types of devices may be employed as well. In the specific embodiment illustrated, the two actuators 80 for the apparatus 10 are connected in one of the hydraulic circuits 130 or 132 shown in FIGS. 5 and 6, respectively, for operating their spindles 106 to position wheel assemblies 42A and 43A for steering purposes.

In the hydraulic circuit 130, the two actuators 80 are hydraulically connected in series with suitable four way control valve 134 that is supplied with hydraulic liquid under pressure by suitable pump 136 driven by motor 138 (all carried suitably by frame 40). When actuators 80 are inoperative, the hydraulic liquid supplied by pump 136 returns to tank 140 through suitable relief valve 142.

It is to be understood that the actuators 80 as shown in FIGS. 5 and 6 are only diagrammatically illustrated. The specific actuator 80 shown in FIG. 4 is of the double rack type with it being understood that each end of the rack is operably mounted in a hydraulic cylinder for hydraulic cylinder-piston type operation in the manner indicated in the hydraulic diagram, which in the circuit 130 will effect pivoting or rotating of the spindles 106 of the pair of actuators 80 in equal but opposite directions to effect the positioning indicated in FIGS. 7 – 9, with the wheel 70 that is forward in the direction of movement desired being turned in the turning direction desired.

The circuiting of FIG. 6 is the same up to four way control valve 134, with the actuators 80 being shown connected in parallel rather than in series. Here again the actuator spindles of the apparatus 10 will pivot or rotate in equal but opposite directions.

Alternately, each actuator 80 may have its own four way control valve 134 for independent steering control of the respective drive wheels 70. Whatever hydraulic pressure liquid supply arrangement is adopted, the actuators should be appropriately oriented relative to the main frame 40 so that operation of the controlling four way control valves 134 employed, through push button controls operated by the operator, positions the wheel assemblies 42A and 43A in the manner indicated in FIGS. 7 – 9.

Directing wheels 70 normally, or transversely, of apparatus 10 (see FIG. 9) and driving them in opposite directions permits the apparatus 10 to be rotated (in a horizontal plane) in its own length (and thus about a vertical axis adjacent its midlength point). With the wheels 70 so positioned and driven in the same direction, apparatus 10 will move sidewise, as between adjacent loading bays 13. Added flexibility of turning or steering control is achieved by individual speed control of wheels 70, whereby one or the other of the wheels 70 may be slowed or speeded up relative to the other to facilitate maneuvering of apparatus 10. This is achieved by employing appropriate controls operated from control panel 62 which operate suitable mechanisms controlling the drive speed of wheels 70 (such as by way of hydraulic pressure liquid volume flow control through the respective wheel drives).

Details of said apparatus 10 that are shown but not described (and pertain to features not concerned with steering control arrangement 41) are fully disclosed in my said application.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. In a mobile conveyor apparatus comprising an elongated frame, a conveyor belt trained over said frame and extending between the ends thereof, means for driving said conveyor belt, and wheel means journaled on said frame for supporting said frame on a load support surface, the improvement wherein said wheel means comprises:

a pair of wheels at each end of said frame,
one wheel of each pair of wheels being mounted for pivotal steering control movement about a vertical axis,
said one wheels being diagonally related relative to said frame,
said other wheels being of the caster type,
means for driving said one wheels in forward and reverse directions,
and means for selectively pivoting said one wheels about their respective vertical axes to provide steering control for said apparatus.

2. In a mobile conveyor apparatus comprising an elongate frame, a conveyor belt trained over said frame and defining an upwardly facing conveying surface, means for driving said conveyor belt, and wheel means journaled on said frame for supporting said frame on a load support surface, the improvement wherein said wheel means comprises:

a pair of wheels at each end of said frame,
one wheel of each pair of wheels being mounted for pivotal steering control movement about a vertical axis over a range of at least 180° relative to the transverse dimension of said frame,
said one wheels being diagonally related relative to said frame, said other wheels being of the idler caster type, means for driving said one wheels in forward and reverse directions, and power means for selectively pivoting said one wheels about their respective vertical axes to provide steering control for said apparatus.

3. In a mobile conveyor apparatus comprising an elongate frame, a conveyor belt trained over said frame and defining an upwardly facing conveying surface extending lognitudinally thereof, means for driving said conveyor belt, and wheel means journaled on said frame for supporting said frame on a load support surface, the improvement wherein said wheel means comprises:

a pair of wheels at each end of said frame, one wheel of each pair of wheels being mounted for pivotal steering control movement about a vertical axis over a range of at least 180° relative to the transverse dimension of said frame, said one wheels being on opposite sides of said frame and diagonally related relative to said frame, said other wheels being of the idler caster type, means for driving said one wheels in forward and reverse directions, and power means for selectively pivoting said one wheels about their respective vertical axes over said movement range to provide steering control for said apparatus, whereby when said one wheels are disposed transversely of said frame, said apparatus may be moved laterally thereof by driving said one wheels, whereby when said one wheels are disposed longitudinally of said frame, said apparatus may be moved longiudinally thereof by driving said one wheels, and whereby said frame may be rotated in a horizontal plane within its length by positioning said one wheels diagonally of said frame and driving said one wheels in opposite directions.

4. The improvement set forth in claim 3 wherein:

said means for driving said one wheels comprises each of said one wheels having a rim portion and means for reversably hydraulic driving said rim portion and mounted within the respective rim portions.

5. The improvement set forth in claim 3 wherein:

said power means for pivoting said one wheels comprises a hydraulically powered rotary actuator for each said one wheel and means coupling said actuators to the respective said one wheels for pivoting same over said range.

6. The improvement set forth in claim 3 wherein:

said means for pivoting said one wheels includes means for simultaneously pivoting same in equal and opposite amounts.

7. The improvement set forth in claim 6 wherein:

said driving means includes means for varying the speed of drive of said wheels independently of each other.

* * * * *